United States Patent [19]

Ogasawara

[11] Patent Number: 4,719,626
[45] Date of Patent: Jan. 12, 1988

[54] DIAGNOSTIC METHOD AND APPARATUS FOR CHANNEL CONTROL APPARATUS

[75] Inventor: Yasuo Ogasawara, Zama, Japan
[73] Assignee: Fujitsu Limited, Kawasaki, Japan
[21] Appl. No.: 767,795
[22] PCT Filed: Dec. 27, 1984
[86] PCT No.: PCT/JP84/00621
  § 371 Date: Aug. 14, 1985
  § 102(e) Date: Aug. 14, 1985
[87] PCT Pub. No.: WO85/03151
  PCT Pub. Date: Jul. 18, 1985

[30] Foreign Application Priority Data

Dec. 30, 1983 [JP] Japan ................................. 58-248218

[51] Int. Cl.⁴ .............................................. G06F 11/00
[52] U.S. Cl. ........................................ 371/16; 371/22; 371/23
[58] Field of Search ..................... 371/16, 15, 17, 22, 371/23, 24, 8, 20, 13; 364/200, 900; 375/10

[56] References Cited

U.S. PATENT DOCUMENTS

3,916,177 10/1975 Greenwald ........................... 371/16
3,953,717 4/1976 Rottier .................................... 371/17
3,987,420 10/1976 Badajnari .............................. 371/17
4,031,375 6/1977 Jaskulke ................................ 371/16
4,385,384 5/1983 Rosbury ................................ 371/22
4,573,152 2/1986 Greene .................................. 371/22

Primary Examiner—Michael R. Fleming
Attorney, Agent, or Firm—Staas & Halsey

[57] ABSTRACT

In a system where a central control unit, a main memory unit and a channel control unit are connected to a multi-bus, input/output control units are connected in series through the channel control unit and a common bus and each input/output unit, such as a printer or magnetic tape unit, is connected to each input/output control unit. The channel control unit includes a pseudo-input/output control unit which can simulate the operation of an input/output control unit. This pseudo-input/output control unit is the input/output control unit only for diagnosis of the common bus interface of the channel control. This pseudo-input/output control unit also transfers data in the program mode/direct memory access mode based on a command sent from the channel control unit and communicates the current situation or status to an central control unit through the interrupt sequence after the end of data transfer in the direct memory access mode. Also included is a diagnostic method and an apparatus for a channel control unit which stops the transfer operation and communicates the current situation through the interrupt sequence in case failure of common bus interface is detected during data transfer control.

10 Claims, 6 Drawing Figures

DIAGNOSTIC METHOD AND APPARATUS FOR CHANNEL CONTROL APPARATUS

BACKGROUND OF THE INVENTION

1. Field of the Invention

The present invention relates to a diagnostic method and an apparatus for a channel control apparatus which controls input and output units, depending on commands sent from a central processing unit, through input and output control units (magnetic tape control unit, file control unit, interface control unit, etc.) connected to a common bus in accordance with predetermined interface control procedures and, more particularly, to a diagnostic method and an apparatus for a channel control apparatus which can easily separate a defective part and improve diagnostic performance by providing a pseudo-input/output control unit, which can simulate operations of input and output control units, in the channel control unit.

2. Description of the Related Art

A channel control apparatus controls a variety of input and output control units through a common bus. For example, in a system where a central control unit, a main memory unit and a channel control unit are connected to a multi-path, the input and output control units are connected in series through the channel control unit via the common bus, and the input and output units, such as a printer and a magnetic tape unit are connected to each input/output control unit. In this system, the channel control unit controls the input/output units through the input/output control unit connected to the common bus depending on commands sent from the central control unit, and data transfer control is carried out in a program control mode and a direct memory access transfer mode, etc.

In this system, in the program control mode, data transfer is carried out by controlling the input/output control unit while the channel control unit is connected to the central control unit. While in the direct memory access transfer mode, data transfer is carried out by making an access directly to the main memory unit with the channel control unit connected to the main memory unit.

When the central control unit detects a failure, a diagnostic operation is carried out to detect a defective unit; however, since the input/output control unit connected to the channel control unit through the common bus has a structure corresponding to respective input/output units to which it is connected, a diagnostic method and procedures corresponding to each type of input/output unit are necessary and therefore many test data for diagnosis must be prepared and such data must also be selected during a diagnostic test to correspond to the type input/output unit.

Moreover, if a failure occurs in the common bus continuously due to a failure a driver of the input/output control unit connected to the common bus, it is not possible to perform the diagnostic procedures using the defective the input/output control unit.

As explained above, since the channel control unit of the prior art is mainly composed of a data transfer circuit and a control circuit, a disadvantage results in that failure diagnosis is carried out by operating the input/output control unit through the channel control unit and, as a result, the diagnostic program is complicated and it is very difficult to identify and remove a defective unit connected in series through the common bus.

SUMMARY OF THE INVENTION

It is an object of the present invention to provide a diagnostic method for detecting whether a common bus interface of a channel control unit is normal by providing a pseudo-input/output control unit which can simulate the operations of any input/output control unit connected to the channel control unit, and for separating or disconnecting actual input/output control unit connected in series through the common bus from the channel control unit during the simulation.

It is another object of the present invention to perform diagnostics for failure detection in the channel control unit by sending parity error data and executing abnormal operations such as common bus time-out, etc. in accordance with the instructions of programs in said pseudo input/output control unit.

It is a further object of the present invention to provide a method of high speed diagnosis for the common controller of a plurality of input/output control units, namely the channel control unit with a view toward enhancing system reliability.

According to the present invention, a defective unit can be determined from among a channel control unit and an input/output control unit by providing a pseudo-input/output control unit which can simulate the operations of different types of input/output control units as well as an input/output units inside the channel control unit.

Moreover, diagnosis of the channel control unit can be performed without regard to the type input/output control units and input/output units connected to the channel control unit.

Accordingly, the present invention provides a very economical diagnostic procedure which is capable of reducing failure repair time and realising individual diagnosis of the channel control unit.

DESCRIPTION OF THE PREFERRED EMBODIMENTS

The preferred embodiment of the present invention is explained with reference to the accompanying drawings.

Figure 1:
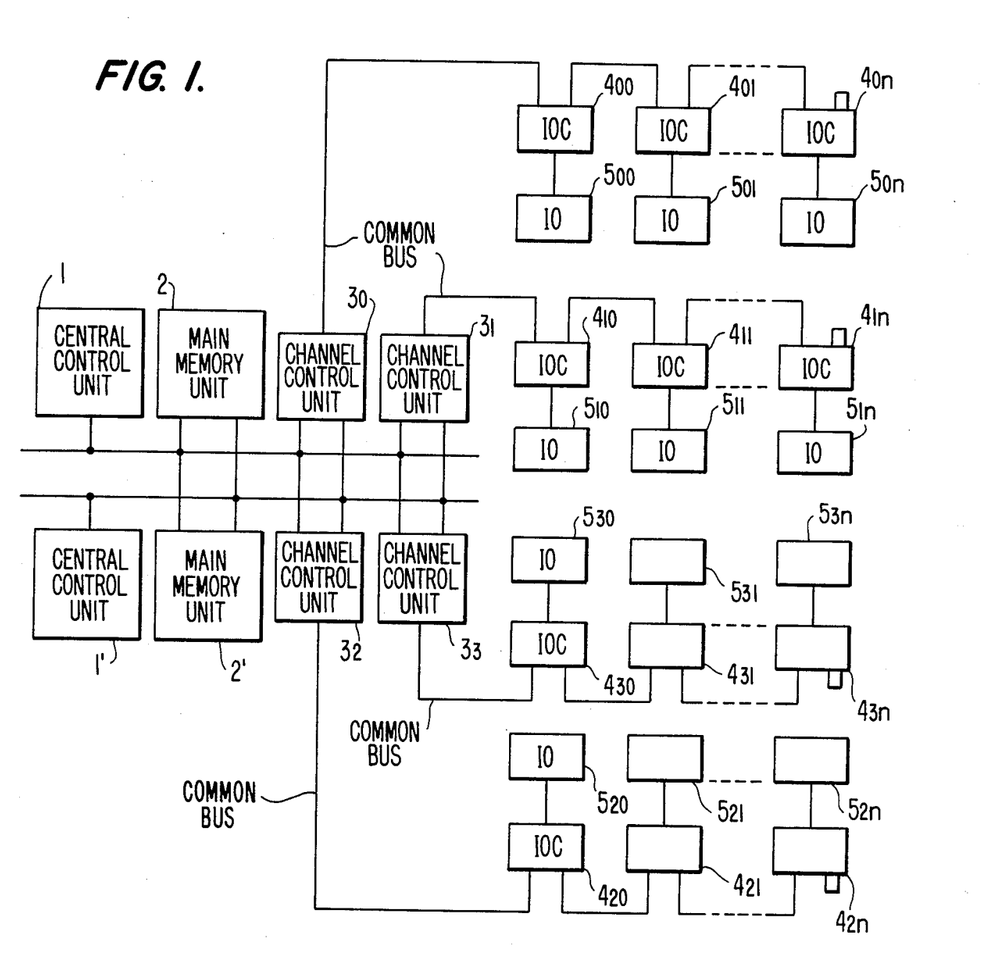
FIG. 1 is a block diagram of an essential part of a data processing system to which the present invention is applied.

FIG. 1 shows a structure of data processing system in which 1, 1' are central control units(CC), 2, 2' are main memory units(MM), $3_0 \sim 3_3$ are channel control units (CHC), $4_{00} \sim 4_{3n}$ are input/output control units, $5_{00} \sim 5_{3n}$ are input/output units.

In this figure, the central control units 1, 1' and the main memory units 2, 2' are perfectly duplicated, that is, identical.

The central control unit 1 and main memory unit 2 act as a regular processing system while the central control unit 1' and the main memory unit 2' act as a standby processing system.

In the data processing system where the central control units 1, 1', main memory units 2, 2' and channel control units $3_0 \sim 3_3$ are connected to a multi-bus, the input/output control units $4_{00} \sim 4_{3n}$ are connected in series through the channel control units $3_0 \sim 3_3$ and the common bus, and the input/output units $5_{00} \sim 5_{3n}$ such as a printer and a magnetic tape unit, etc. are connected to the input/output control units $4_{00} \sim 4_{3n}$, the channel control units $3_0 \sim 3_3$ control the input/output units $5_{00} \sim 5_{3n}$ through the input/output control units $4_{00} \sim 4_{3n}$ connected to the common bus in accordance with the commands sent from the central control unit 1,1' in order to transfer the data in a program control mode and a direct memory access transfer mode, etc.

Figure 2:
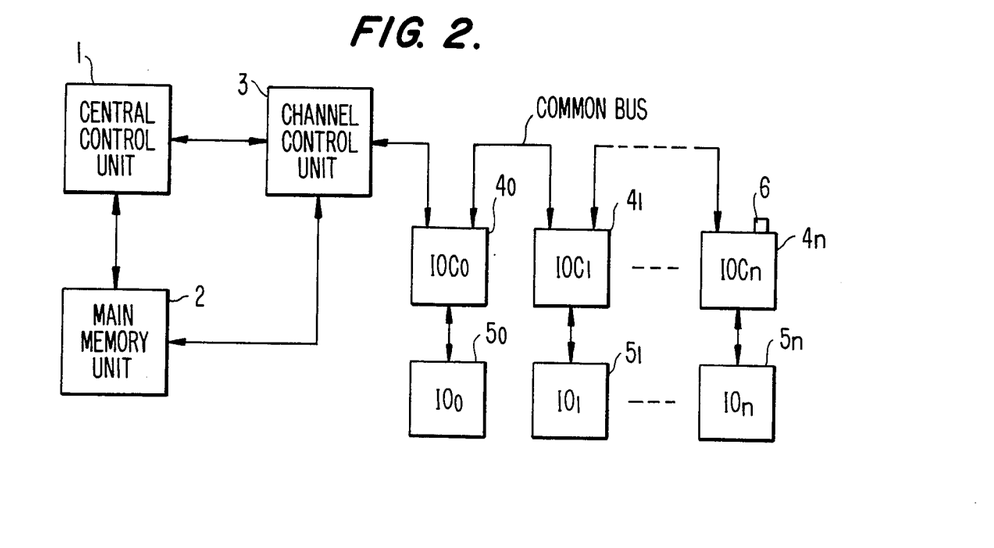
FIG. 2 illustrates connecting conditions of a channel control unit to a central control unit to which the present invention is applied.

FIG. 2 shows the connections between the central control unit 1, main memory unit 2 and channel control unit 3. In this figure, a plurality of input/output control units $4_0, 4_1, \ldots, 4_n$ are connected in series to the channel control unit 3 through the common bus and the last input/output control unit $4_n$ is not connected with the input/output control unit but connected with a termination resistor 6. Each of the input/output control units $4_0, 4_1, \ldots, 4_n$ is respectively connected with the input/output units $5_0, 5_1, \ldots, 5_n$. The channel control unit 3 controls the input/output control units $4_0, 4_1, \ldots, 4_n$ in the program control mode where it is connected to the central control unit 1, and executes data transfer by direct access to the main memory unit 2 in the direct memory access transfer mode when connected to the main memory unit 2.

Figure 3:
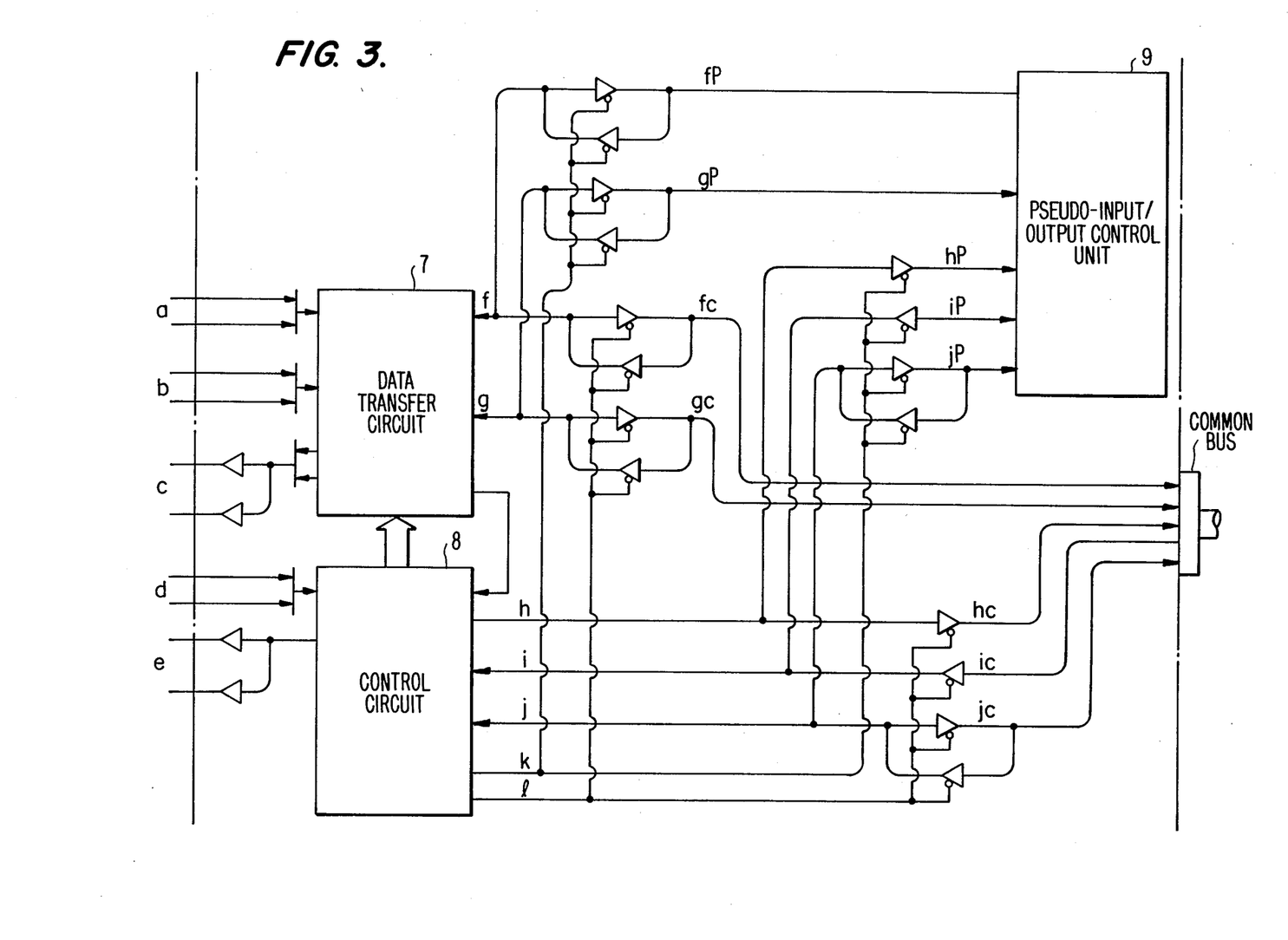
FIG. 3 illustrates the structure of the channel control unit to which the present invention is applied.

FIG. 3 is an embodiment of the channel control unit 3 to which the present invention is applied. 7 is a data transfer circuit which performs transmission and reception of data through the common bus, transmission and reception of an address signal and transmission of a clear signal, etc. 8 is a control circuit which performs transmission and reception of control signal through the common bus. 9 is a pseudo-input/output control unit which artificially controls inputs and outputs for diagnosis while executing internal diagnosis routines for the channel control unit 3, and controls diagnosis of the interface between the change and the memory and the common bus interface. The terminals a, b, c, d and e are connected to the multi-bus. The address signal of the input/output control unit and the command sent from the central control unit 1,1' are transferred to the terminal a while the data is sent from the main memory unit 2 to the terminal b. Moreover, the stored data and address signals are sent to the main memory unit 2 from the terminal c. A control signal is transferred to the terminal d from the central processing unit, and various kinds of control signals are sent to the central processing unit from the terminal e.

Next, the common bus interface signal line within the channel control unit will be explained. f(fp, fc) is both-way data line including the parity check bit line. g(gp, gc) is also a bi-directional address line including signal lines for expanded addresses. h(hp, hc) carries a signal as an answer signal when an interrupt request is accepted by the central control unit 1, address information to be sent to the unit which the central control unit 1 requests to be interrupted, a system reset signal and an answer signal for the request to obtain the right to use the common bus. i(ip, ic) carries a request signal for the input/output control unit to obtain the right to use the bus, a signal for each input/output control unit to request an interrupt of the central control unit, an answer signal for indicating acquisition of the right to use the next bus, and an answer signal indicating that the interrupt has been accepted. j(jp, jc) carries a signal for the central control unit to designate the direction of data transfer to the input/output control unit, a signal for indicating that the unit of data transfer is a word or a byte, a signal indicating whether the parity bit is effective, and a signal for requesting transmission or reception of data for the data tranfer. The common bus interface lines discussed above are generally established or common in the ordinary data processing system of this type.

The information lines K and l are newly added in the present invention. K is a holding or inactivating signal line for holding the pseudo-input/output control unit 9, while l is a holding line for decoupling the common bus. Namely, when this channel control unit is used under ordinary or normal conditions (it is connected to a plurality of different types of input/output control units through the common bus), the holding signal for the pseudo-input/output control unit 9 is transmitted to the line K and the pseudo-input/output control unit 9 is separated from the various common bus interface lines. When making a diagnosis of the common bus interface with the channel control unit, a control signal is applied to the terminal d from the central processing unit at the start of a diagnostic execution program of centeral control unit, and a common bus decoupling signal is sent to the information line l through the control unit 8 and the common bus extending from the channel control unit is disconnected.

Figure 4:
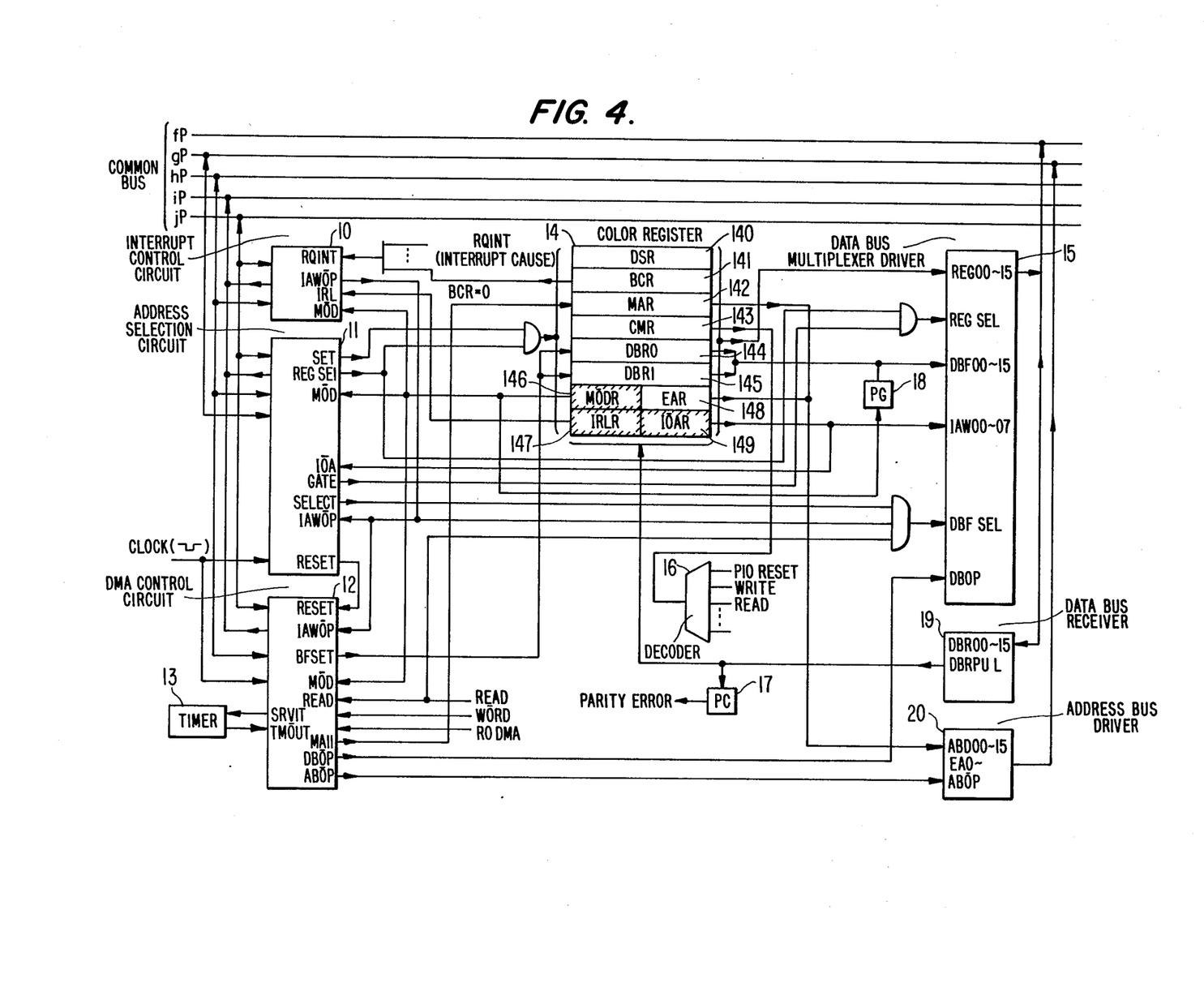
FIG. 4 illustrates the structure of a pseudo-input/output control unit and a pseudo-input/output unit in the channel control unit to which the present invention is applied.

FIG. 4 is a structure of a pseudo-input/output control unit shown in FIG. 3, in which 10 is an interrupt control circuit, 11 is an address selection circuit, 12 is a direct memory access (DMA) control circuit, 13 is a timer, 14 is a control register, 15 is a data bus multiplexer driver, 16 is a command decoder, 17 is a parity check circuit, 18 is a parity generator, 19 is a data bus receiver, and 20 is an address bus driver. When the address signal and control signal (write or read instruction) for this pseudo-input/output control unit are transmitted through the gp and jp signal lines from the central control unit 1, these signals are sensed by the address selection circuit 11.

(I) Operations using a program control mode are explained hereunder.

1 Writing to control register 14 (program control mode)

The address selection circuit 11 compares the address signal with the intrinsic address assigned to the pseudo-input/output control unit 9 or with the address preset in register IOAR 149. When the addresses match any of those mentioned above, the address selection circuit 11 transmits a write setting signal (SET) to control register 14 and a register selection signal (REG SEL) to the control register 14 designated by the address, and it also selects a desired register from among the various registers 140 ~ 149 of the control register 14. Meanwhile, the data (including a parity) is sent to the data bus receiver 19 through the Fp signal line and information is written into the selected register of the control registers 14 through the parity check circuit 17.

In the control register 14, is a device status register (DSR) which designates time-out information, data error information and end information. 141 is a byte counter register (BCR) which designates a number of bytes of data to be transmitted. 142 is a memory address register (MAR) which indicates an object address of data to be transmitted. 143 is a command register (CMR) which receives a command sent from the central control unit, reads it into the memory by the operation of the pseudo-input/output unit itself and designates a DMA control operation such as designation of data writing. 144, and 145 are data buffer regiters (DBR0, 1) which temporarily accummulate the write data sent from the channel control unit and send their contents to the data bus when the read command is issued from the channel control unit 3. 146 is a mode register (MODR) which designates the pseudo normal mode or operation mode of byte or word. 147 is an interrupt level register (IRLR) used to designate a different interrupt level for each input/output control unit. 148 is an expansion memory address register (EAR) which designates an address of and in an expansion memory. 149 is an input/output unit address register which designates can address of an input/output control unit for selecting individual addresses of said input/output control unit.

2 Reading from control register 14 (program control mode)

The address selection circuit 11 sends to register 14 a read setting signal (SET) for control register 14 and a register selection signal (REG SEL) and selects a desired register from among the various registers 140~149 in the control register 14. The address selection circuit 11 further sends a gate signal (GATE) for reading the register 14 and sends a selection gate signal to the register selection terminal (REG SEL) of the data bus multiplexer driver 15. The information in designated register in the control register 14 which is designated to be read is transferred to the data bus multiplexer driver 15 and is then sent to the main memory unit 2 through the fp line.

(II) Operations using a direct memory access transfer mode are explained hereunder.

1 Writing to the data buffer registers 144 and 155 in the direct memory access transfer mode The pseudo-input/output unit is designated in the control register 14 by the program control mode as the dependent or active unit of the channel control unit 1 and starts the direct memory access transfer mode (self-standing operation) when the start bit of command register 143 is turned ON. The information in the command register 143 translates the command information in the command decoder 16 and thereby the DMA start request signal (RQDMA) and the write command signal (WRITE) are sent to the DMA control circuit 12. Meanwhile, the address information from memory address register 142, namely the address information for the main memory unit 2 is sent to the address bus driver 20 and is then sent to the main memory unit 2 through the gp signal line.

The DMA control circuit 12 then sends the signal (BFSET) for fetching the data sent from the main memory unit 2 to the data buffer registers 144 and 145. Data is sent to the data bus receiver 19 through the fp line from the main memory unit 2. After a parity check by the parity check circuit 17, the data is written to the data buffer registers 144 and 145.

Since data is loaded into the plurality of address regions of the main memory unit 2 during an operation in the direct access transfer mode, data is written into the data buffer registers 144 and 145, while the address of memory address register 142 is renewed by an increment of one. The MA+1 terminal of the DMA control circuit 12 sends this address renewal information or signal.

In the byte counter register 141, one is decremented at the end of each transfer and the transfer terminates when the count value written into the byte counter register reaches zero. The interrupt control circuit 10 receives the interrupt request signal (RQINT) from the central control unit 1 as the signal for informing the end of operation when the DMA transfer is terminated or when time-out failure is detected and sends the signal through the ip signal line. The interrupt level register 147 and input/output unit address register 149 send the interrupt level data and pertinent input/output unit number to the terminals IAW 00~07 of the data bus multiplexer driver 15 and also send the information in device status register 140 to the central control unit 1 through the fp line.

IAWOP in the interrupt control circuit 10 is the terminal for the signal which opens the sending gate for interrupt address word in register IRLR 147, IRL is the interrupt level setting signal terminal and MOD is the operation mode designation terminal. Moreover, IOA of the address selection circuit 11 is the input terminal for address information of the input/output unit, SELECT is selection signal terminal for data buffer registers 144 and 145, and RESET is the reset terminal of DMA control circuit 12. DBOP of the DMA control circuit 12 is a terminal for a signal for opening the data sending gate of data bus multiplexer driver 15 and ABOP is a terminal for a signal for opening the gate for sending address information of the address bus driver 20.

2 Reading from data buffer registers 144, 145 in the direct memory access transfer mode The channel control unit starts the direct memory access transfer mode (self-standing operation) with the start bit of the command register 143 in the pseudo input/output control unit 9. Information from command register 143 translates the command information in the command decoder 16 and sends the DMA start request signal (RQDMA), read command (READ) and transfer unit designation (WORD) signal to the DMA control circuit 12.

Meanwhile, the address information from memory address register 142, namely the address information for the main memory unit 2 as the destination of the transfer, is sent to the address bus driver 20 and then sent to the main memory unit through the gp signal line. The DMA control circuit 12 sends the signal (DBOP) for opening the gate for sending the data. Data from data buffer registers 144 and 145 is sent to the main memory unit 2 through the data bus multiplexer driver 15 and the fp line. As in the case of the writing operation explained in the section II.1 above, data from data buffer registers 144 and 145 is also read in this read operation while the address of memory address register 142 is renewed with an increment of plus one (+1).

When read transfer to the main memory unit is completed, the byte counter register 141 sends the interrupt request signal (RQINT) to the interrupt control circuit 10 and the interrupt control circuit 10 sends the interrupt request signal to the central control unit 1 through the ip signal line. The interrupt level register 147 and input/output unit address register 149 send the interrupt level information and pertinent input/output unit number to the terminals IAW 00~07 of the data bus multiplexer driver 15 and also send the information in device status register 140 to the central control unit through the fp line.

The ordinary or normal diagnostic function of the pseudo-input/output control unit has been explained above; however, the pseudo-input/output control unit 9 of the present invention includes a mode register 146, an interrupt level register 147 and an input/output unit address register 149 which are newly provided with respect to an ordinary input/output control unit. It is also possible to simulate the pseudo-normal operation by sending various kinds of defective signals by setting the mode register 146 to a pseudo-normal operation mode, failure of input/output control unit connected to the common bus can be detected easily.

Figure 5:
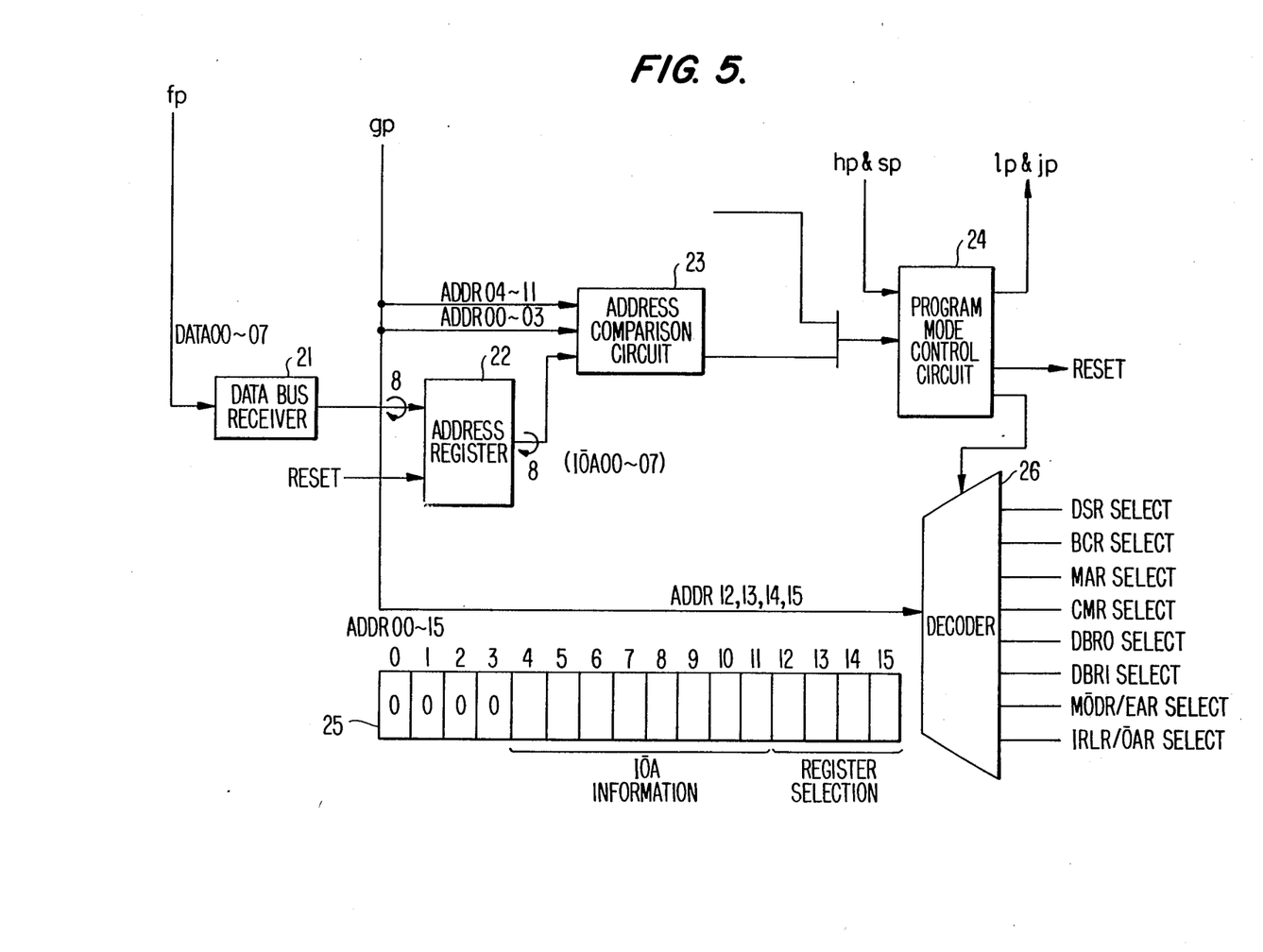
FIG. 5 illustrates the structure of an address selection circuit within the pseudo-input/output control unit 9 and the pseudo-input/output unit to which the present invention is applied.

FIG. 5 shows an embodiment of the address selection circuit 11 shown in FIG. 4. 22 is an input/output control unit address register and a variable register intrinsic to this pseudo-input/output control unit. This input/output control unit address register 22 can simulate the intrinsic address of each input/output unit (input/output control unit) due to its variable function.

The address for an input/output apparatus is previously written in the variable register 22 through the fp line. Meanwhile, the address information sent through the gp signal line is compared with the input/output unit address information(IOA) in the address comparison circuit 23. When the addresses match, the program mode control circuit 24 is started and the register selection circuit 26 is loaded. 25 depicts the format of address information sent through the gp signal line. The input/output unit address information (IOA) is intrinsic or constant in each input/output unit (input/output control unit) but in the pseudo-input/output control unit by of the present invention it is variable. The intrinsic address of each input/output control unit can be simulated by providing the variable input/output unit address.

Figure 6:
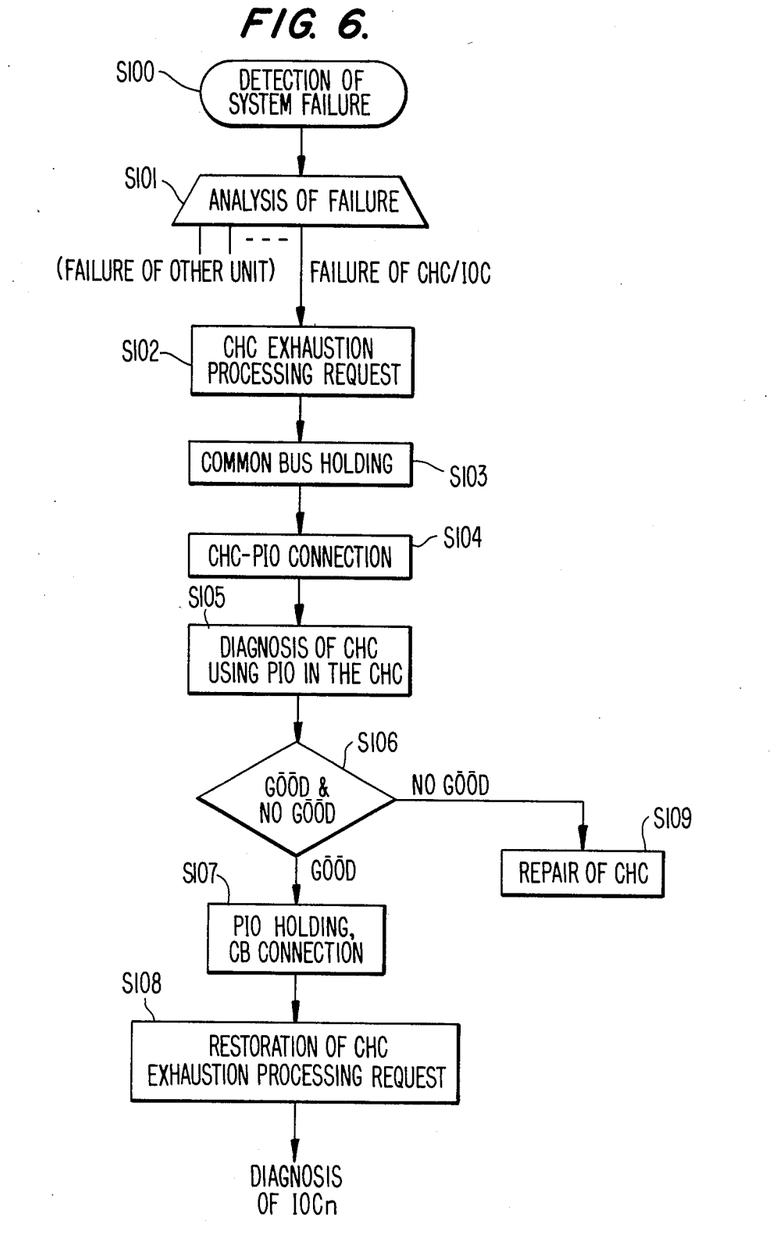
FIG. 6 is a flow chart of a diagnostic procedure for the channel control unit to which the present invention is applied.

FIG. 6 is a flow chart of a diagnostic procedure for the channel control unit of the present invention. First, in the step S100, the central control unit 1 detects a system failure. In the step S101, the central control unit 1 analyzes the failure and the procedure proceeds to the step S102 when the failure relates to the channel control unit 3 and input/output control unit 4. In the step S102, the exhaustion processing request is supplied to the channel control unit 3, namely termination processing for the channel control unit 3 of the present or current operation is carried out.

In the step S103, the common bus is disconnected. In the past, it has been impossible to disconnect the common bus and therefore, it has also been impossible to detect a failure occurring in any of the channel control units or or various input/output control units.

Next, the channel control unit 3 and the pseudo input/output unit are connected in the step S104. In the step S105, diagnostic procedures are applied by the channel control unit 3 using the pseudo input/output control unit 9 in the channel control unit 3.

In the step S106, the central control unit sends the diagnostic order, reads the result of diagnosis, compares it with good information and determines whether it is good. When the result is proved to be good, the pseudo-input/output control unit 9 is inactivated 107 and disconnection condition of the common bus is terminated. On the other hand, when the result is proved to be no good or bad, the procedure moves to the step S109 and the channel control unit (CHC) is repaired.

When the result of the judgment in the step S106 is good, it means that the common bus interface of the channel control unit 3 is good and it has been proved that a cause of system failure lies in the input/output control unit 4 or input/output unit 5 connected to the channel control unit 3 through the common bus. In the step S108, the exhaustion processing request of the channel control unit 3 is restored or terminated, that is, the processing for realizing or restoring normal operations with input/output control unit 4 connected to the channel control unit 3 is carried out.

As the next step, various actual input/output control units connected from the channel control unit through common bus are designated and the diagnostic procedures corresponding to each unit are sequentially carried out.

As explained above, the present invention provides a pseudo-input/output control unit 9 which can simulate the operation of an input/output control unit 3 within the channel control unit. This pseudo-input/output control unit 9 can be formed as an integrated circuit and, as a result, the channel control unit 3 can be formed small in size. When the pseudo-input/output control unit 9 is provided for the common bus, there arises problems concerning restriction in length of the common bus and the separation of common bus; however, provision of the pseudo-input/output control unit 9 in the channel control unit 3 as in the present invention results in the advantage that the common bus can be separated or disconnected very easily. Moreover, since it is also possible to simulate a pseudo-normal operation, the failure detecting function of any input/output control unit 4 connected to the common bus can easily be diagnosed. In addition, since the diagnostic test data can be fixed because the diagnostic procedures are performed during operation of the pseudo-input/output control unit 9, the channel control unit can be diagnosed easily at a high speed even when various types of input/output control units 4 are connected to the common bus.

I claim:

1. An automatic diagnostic method for a channel control unit which controls input/output units through at least one input/output control unit connected to a common bus in accordance with predetermined common bus interface control procedures by receiving commands from a central control unit, said method comprising the steps of:
 disconnecting the channel control unit from the common bus and thereby disconnecting the input/output control unit from the channel control unit;
 connecting a pseudo-input/output control unit which substitutes for the disconnected input/output control unit, the pseudo-input/output control unit being provided in the channel control unit; and
 conducting automatic diagnostic procedures for the channel control unit while said common bus is disconnected from the input/output control units and the pseudo-input/output control unit is activated in accordance with commands from the central control unit by the pseudo-input/output control unit simulating the activities of the disconnected input/output control unit.

2. An automatic diagnostic method for a channel control unit according to claim 1, wherein the channel control unit includes an automatic disconnection/connection means which performing a step of automatically disconnecting/connecting said pseudo-input/output control unit in accordance with a command from said central control unit.

3. An automatic diagnostic method for a channel control unit according to claim 1, further comprising the step of loading said pseudo-input/output control unit with an address of one of the input/output control units using a program.

4. An automatic diagnostic method for a channel control unit according to claim 1, further comprising the step of loading said pseudo-input/output control with an interrupt level for the central control unit using a program.

5. A channel control unit connected to a central control unit and which controls input/output units through input/output control units connected to a common bus in accordance with predetermined common bus interface control procedures, said channel control unit comprising:

data transfer and control means, connected to the common bus and the central control unit, for controlling data transfer over the common bus to and from the central control unit; and pseudo-input/output control unit means, connected to said data transfer and control means and connectable to the central control unit by said data transfer and control means, for simulating a plurality of input/output control units connected to said channel control unit through the common bus.

6. A channel control unit according to claim 5, wherein said channel control unit further comprises automatic disconnection/connection means, connected to said common bus and said pseudo-input/output control unit, for automatically disconnecting/connecting said common bus with said data transfer and control means and with said pseudo-input/output control unit in accordance with a command from the central control unit.

7. An automatic diagnostic method for a channel control unit according to claim 1, further comprising the step of sending, using the pseudo-input/output control unit, parity error data in accordance with the instruction of a program and simulating a time-out on the common bus.

8. A channel control unit according to claim 5, wherein said pseudo-input/output control unit includes means, connectable to the central control unit to receive a received address, for storing an address of one of the input/output control units allowing said pseudo-input/output control unit to be addressed as the one of the input/output control units by comparing the received address with the stored address and activating said pseudo-input/output control unit when the received and stored addresses are coincident.

9. A channel control unit according to claim 5, wherein said channel control unit is connected to the central control unit and said pseudo-input/output control unit includes means, connectable to the central control unit, for interrupting the central control unit and communicating channel control unit status after a simulation.

10. A channel control unit according to claim 5, wherein said pseudo-input/output control unit includes means, connectable to the central control unit, for producing parity error data and means, connectable to the central control unit, for simulating a time out of one of the input/output control units.

* * * * *